Figure 1:
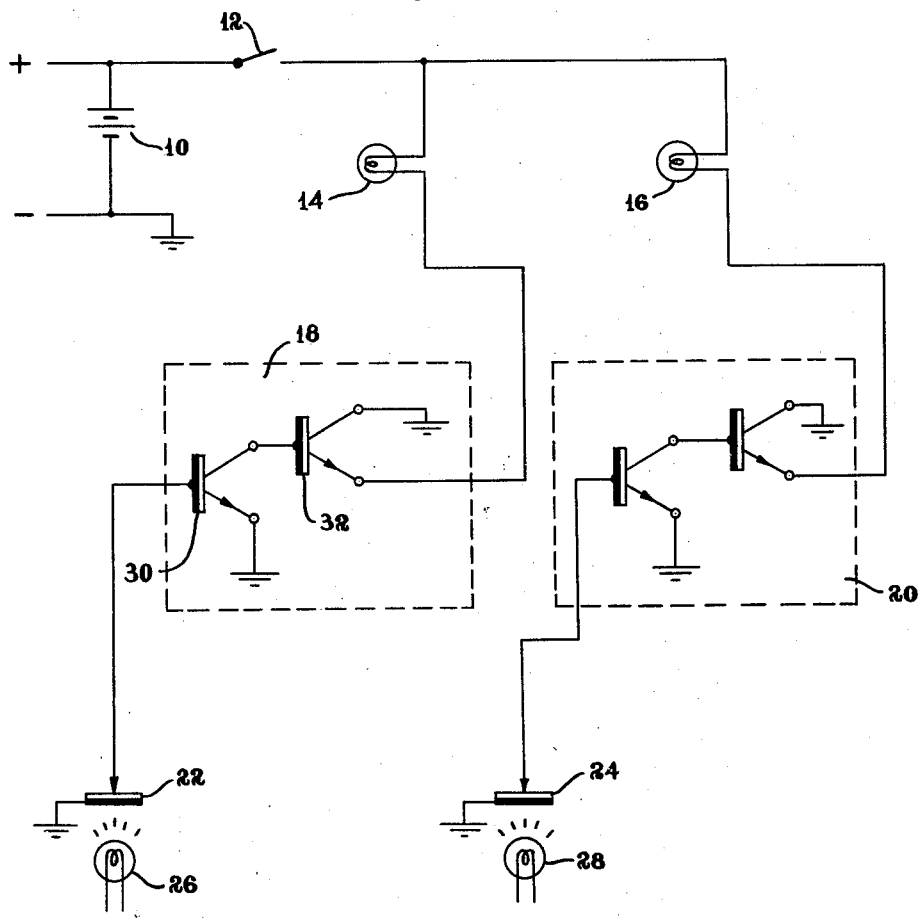

Aug. 11, 1964  C. W. FARRELL  3,144,561
REMOTE LIGHT INDICATOR SYSTEM FOR VEHICLES
Filed May 19, 1960

INVENTOR
CHRISTOPHER W. FARRELL

BY
ATTORNEYS

Patent 3,144,561

REMOTE LIGHT INDICATOR SYSTEM FOR VEHICLES
Christopher W. Farrell, 1237 Palm St., Lantana, Fla.
Filed May 19, 1960, Ser. No. 30,241
2 Claims. (Cl. 250—217)

This invention relates to a remote light monitor system, and more particularly, to a remote light monitor system which is adapted for use on vehicles.

Priorly, numerous systems have been employed to indicate the failure of lights on a vehicle. These systems, however, exhibit numerous disadvantages. For example, they are extremely complex and expensive, requiring a large number of parts, and they serve no additional purpose other than to indicate the operability or the inoperability of the lights.

Accordingly, it is an object of this invention to provide a light indicator system which is extremely simple, economical to manufacture and contains the minimum of parts.

It is a further object of this invention to provide a remote light indicator system which indicates the degree of illumination of the lights being monitored.

It is a further object of this invention to provide a light monitor system which serves the dual function of indicating light failure and which acts as a turn indicator.

It is a further object of this invention to provide a light monitoring system which is simple to install and reliable in operation.

It is another object of this invention to provide a light indicator system which will indicate proper operation of the turn signal lights as well as the brake lights.

Briefly, in accordance with the aspects of this invention, photoelectric cells are positioned in the region of the lights to be monitored and these photoelectric cells are connected through suitable amplifiers, such as transistors, to a light mounted on the instrument panel. Advantageously, the lights or indicators on the instrument panel will indicate the degree of illumination of the lights and thus would indicate flashes of the lights such as the flash of a turn indicating light or the increase in brilliance of the stoplights. Advantageously, the photoelectric cells are mounted above the lights to be monitored and have their sensitive surfaces directed downwardly to prevent the interference of sunlight with the normal operation of the monitor system.

In accordance with other aspects of this invention, the light intensity reaching the photocell is controlled by the positional relationship between the photocell and the light being monitored so that the indicating light on the instrument panel will glow with partial brilliancy under normal operation of the taillight or other lights being monitored. In the instance of the taillights, the monitor lights will glow with increased brilliancy when the brake pedal is depressed. Further, since this system is electrically independent of the light circuits being monitored, the system will indicate proper operation of the brake lights even when the remaining light circuits such as the headlights are disconnected. Still further, since the light reaching the photocell gives an indication of the brilliancy of the light being monitored, the indicator on the instrument panel will flash when the turn signal lights are in operation and the indicator light thus serves the dual purpose of an alarm system and turn indicating light.

These and various other objects and features of this invention will be more clearly understood from a reading of the detailed description of the invention in conjunction with the drawing which is a schematic representation of one illustrative embodiment of this invention.

Referring now to the drawing, there is depicted, in schematic form, battery 10 connected through the ignition switch or other similar switch 12 to a pair of parallel monitor circuits. Merely for the purpose of explaining these parallel circuits, the circuit on the left-hand portion of the drawing will be considered as the alarm circuit for the left-hand portion of the vehicle, while the circuit on the right-hand portion of the drawing will be considered as the monitor circuit for the right-hand side of the vehicle. The indicator lights 14 and 16 are mounted on the instrument panel and are each connected through an individual amplifier 18 and 20, respectively. Photocell 22 is advantageously positioned above left-rear light 26, which might be the left-turn indicating light, while photocell 24 is positioned above right-rear light 28, which might be the right-turn indicating light. Advantageously, photocells 22 and 24 are of the self-generating type which permit them to be connected in a circuit without the necessity for applying a potential to the cathode and anode as is normally required in more conventional photocells. The amplifiers 18 and 20 are identical, and accordingly, it will be necessary to describe only one in detail.

Amplifier 18 includes a pair of transistors 30 and 32 connected in cascade. It is understood, of course, that other forms of amplifiers could be employed. Transistor 30 has its base electrode connected to the anode electrode of photocell 22; the cathode of the photocell being connected through the chassis of the vehicle to the negative terminal of the battery. The emitter electrode of transistor 30 is connected to the negative side of the battery while the collector electrode of transistor 30 is connected to the base electrode of transistor 32. The collector electrode of transistor 32 is connected to the negative terminal of the battery, while the emitter electrode is connected to light 14. As previously mentioned, the photocells such as 22 are positioned above the lights being monitored to prevent the false operation of the monitor system by sunlight.

In this system which is characterized by simplicity of construction, minimum of parts, and reliability of operation, the lights 14 and 16 will indicate the degrees of illumination of the lights such as 26 and 28 which are being monitored. It is to be noted that the entire circuit requires no resistors, condensers, or relays and that the photocells are connected in circuit with the two transistors by means of direct connections. If light 26 is used as a brake light which increases in intensity when the brake pedal is depressed, then indicator light 14 will glow brightly when the brake pedal is depressed regardless of whether the remaining light system is energized. Further, if light 26 is employed as a flashing-light turn indicator, then indicator light 14 will flash when a left turn is being made. Similarly, indicator 16 will flash when a right turn is being made as well as when the brake pedal is depressed. The entire system can be produced in an automobile by the use of six components, namely, two self-generating photocells and four transistors. The pilot lights can be those normally employed as turn indicator lights on the dashboard. The resulting system will monitor the turn lights, the brake lights, and will additionally indicate instantaneously the failure of any one of the lights in the tail light assembly.

While I have shown and described one illustrative embodiment of this invention, it is understood that the inventive concepts thereof, may be employed in other embodiments without departing from the spirit and scope of this invention.

I claim:

1. A remote light monitor system for a vehicle signal system comprising a photocell positioned in the region of a vehicle signal light to be monitored to receive excitation substantially solely therefrom, an amplifier connected to said photocell, and indicator means including a lamp connected to said amplifier and positioned on the instrument panel of the vehicle, whereby said lamp indicates the degree of illumination of the light being monitored, said monitor system thereby producing a remote signal indication of said vehicle signal light and producing an indication of failure of the light.

2. A system according to claim 1, wherein said amplifiers are comprised of a pair of serially connected transistors, means supplying current for the lamps by one of the transistors and wherein one electrode of each of said transistors is connected to the anode of one of the photocells.

References Cited in the file of this patent
UNITED STATES PATENTS

| | | |
|---|---|---|
| 2,172,116 | Warren | Sept. 5, 1939 |
| 2,337,535 | Acs | Dec. 28, 1943 |
| 2,402,394 | Guerra | June 18, 1946 |
| 2,418,845 | Long | Apr. 15, 1947 |
| 2,522,637 | Pripeton | Sept. 19, 1950 |
| 2,779,897 | Ellis | Jan. 29, 1957 |
| 2,797,336 | Loft | June 25, 1957 |
| 2,820,215 | Hughes | Jan. 14, 1958 |
| 2,889,736 | Borg | June 9, 1959 |
| 2,915,938 | Hughes | Dec. 8, 1959 |
| 2,954,475 | White | Sept. 27, 1960 |
| 2,959,709 | Vanaman et al. | Nov. 8, 1960 |